US005276796A

United States Patent [19]

Yamada et al.

[11] Patent Number: 5,276,796

[45] Date of Patent: Jan. 4, 1994

[54] DUAL SCREEN DISPLAY CONTROL APPARATUS FOR A WORD PROCESSOR

[75] Inventors: Manami Yamada, Seto; Chiharu Hori, Nagoya; Misao Kataoka, Mie; Yuri Usami, Nagoya; Kayoko Harada, Nagoya, all of Japan

[73] Assignee: Brother Kogyo Kabushiki Kaisha, Nagoya, Japan

[21] Appl. No.: 615,407

[22] Filed: Nov. 19, 1990

[30] Foreign Application Priority Data

Jan. 27, 1990 [JP] Japan .................................. 2-17023

[51] Int. Cl.[5] .............................................. G06F 15/62

[52] U.S. Cl. .................................... 395/157; 395/145; 345/119

[58] Field of Search ................. 395/157, 145; 340/717

[56] References Cited

U.S. PATENT DOCUMENTS 5,062,060 10/1991 Kolnick .............................. 364/521

OTHER PUBLICATIONS

Microsoft Windows Write User's Guide; 1987; pp. 6-12, 14-15, 32-33, 61-64, 69-71, 75-77.

Vincent Alfieri, *The Best Book of: Word Perfect Version 5.0*, 1988, pp. 225-232.

*Primary Examiner*—Mark K. Zimmerman
*Assistant Examiner*—Joseph H. Feild
*Attorney, Agent, or Firm*—Oliff & Berridge

[57] ABSTRACT

A dual screen control apparatus includes a display which has the capability to display a dual screen having a first display screen and a second display screen. One of the first display screen and the second display screen is a current screen in which a cursor is displayed and the other is a non-current screen. Setting information is displayed only on the current screen so as to enable discrimination of the current screen easily.

20 Claims, 6 Drawing Sheets

DUAL SCREEN DISPLAY CONTROL APPARATUS FOR A WORD PROCESSOR

BACKGROUND OF THE INVENTION

1. Field of the Invention

The present invention relates to a dual screen control apparatus for a word processor, and more particularly to a dual screen control apparatus which makes it easier to discriminate a current screen from a dual screen.

2. Description of the Prior Art

In general, English language word processors, for example, have been provided with displays having a plurality of display lines and a number of functions for facilitating a process for inputting document data and a process for editing the same. In particular, a word processor having a dual screen display function for displaying document data on an upper-region display screen (hereinafter called "a first display screen") and a lower-region display screen (hereinafter called "a second display screen"), both obtained by dividing a display into two screens, on upper and lower screen, has been put into practical use.

Heretofore, document data, which is being input, for example, has been displayed on the first display screen and the already-input document data has been displayed on the second display screen, by making use of the dual screen display function mentioned above. In addition, document data can be input through the first display screen as the current screen on which a cursor is displayed, while enabling reference to the document data on the second display screen, or a part of the document data on the second display screen can be copied by a copying function at a desired position where it is to be inserted in the document data displayed on the first display screen, by changing the current screen and display portions of either the first display screen or the second display screen as needed. For this purpose, a keyboard is provided with a current screen changeover key, and the current screen changeover key is operated so that the current screen can be arbitrarily changed from the first display screen to the second display screen, or vice versa.

In addition, an information display line, i.e., status line, is always provided on the top line, for example, of the display. Displayed on this information display line are character decoration information such as an underline and boldface, setting information about control modes relevant to the printing form such as the justification, enlarged characters, etc., and document names and positional information of a cursor displayed on the current screen.

In this instance, it is difficult to determine whether the current screen is the first display screen or the second display screen, by the contents of information displayed on the information display line. Therefore, a distinction is made based on the display of the cursor as to whether the current screen is the first display screen or the second display screen.

As described above, in the word processor of the type wherein the dual screen display function is provided and the two documents are simultaneously displayed on the display, the cursor is normally shaped like a small rectangle and often unclear visually. In addition, the information display line is always positioned in a fixed position. As a result, in this type of word processor, the problem occurs that no decision can be easily made as to whether the current screen with the cursor displayed thereon is the first display screen or the second display screen.

Therefore, a cursor movement key is commonly operated to move the cursor, thereby making it possible to find the cursor easily. However, in this type of word processor, a problem further occurs in that the position for inputting data is changed by the movement of the cursor. The cursor must then be shifted again to the original data input position by the cursor movement key, so that the operation for making a decision as to whether the current screen is the first display screen or the second display screen is cumbersome.

SUMMARY OF THE INVENTION

Accordingly, it is an object of the present invention to provide a dual screen control apparatus for a word processor, which is capable of easily and clearly determining which screen is a current screen.

It is a further object of the present invention to provide a dual screen control apparatus for a word processor which does not require cursor movement for the determination of a current screen.

According to the present invention, there is provided a dual screen control apparatus for a word processor, comprising: means for inputting document data and various command signals; means for storing document data representative of a plurality of input documents therein; display means having a dual screen comprising a first display screen and a second display screen; display control means for displaying document data representative of a first of two documents read from the document data storing means on the first display screen and displaying a second of the two documents on the second display screen; means for storing therein setting information representative of various control modes related to a character decoration and a printing form, the modes being set via the inputting means; and means for displaying the setting information stored in the setting information storing means only in a predetermined position of a current screen with a cursor displayed thereon, the current screen being either the first display screen or the second display screen.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENTS

Figure 1:
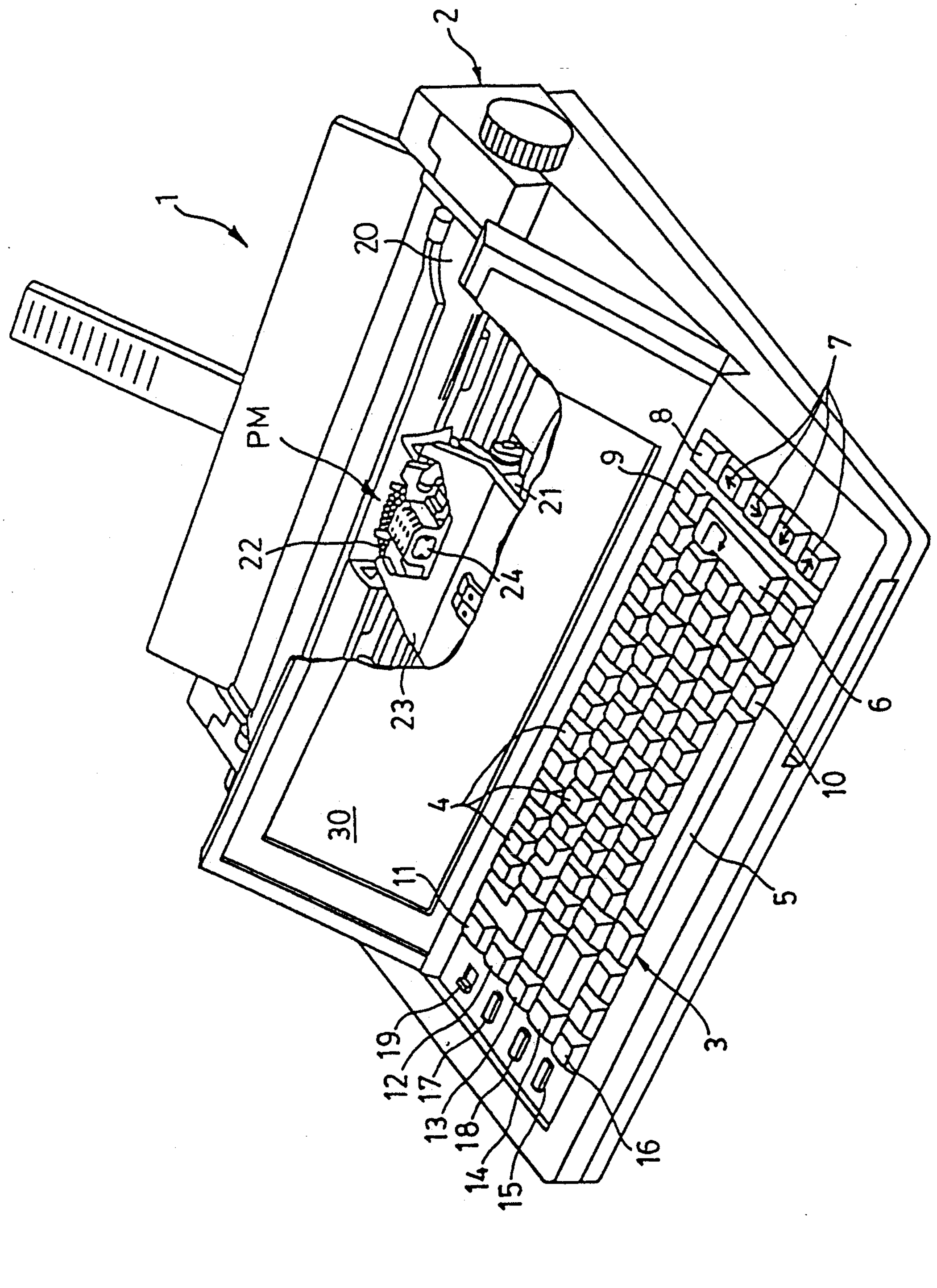
FIG. 1 is a perspective view of a word processor on which a menu displaying apparatus according to one embodiment of the present invention is mounted.

Referring now to the drawings, and particularly to FIG. 1 thereof, a preferred embodiment of the present invention will be described below. The embodiment shows an English language word processor to which the present invention is applied.

As shown in FIG. 1, the word processor 1 has a keyboard 3 disposed in front of a main unit frame 2, and a font-wheel type printing mechanism PM disposed in the main unit frame 2 behind the keyboard 3. At a rear portion of the keyboard 3, a liquid crystal display 30 capable of displaying characters and symbols corresponding to 14 lines is pivotably disposed at a position shown in FIG. 1 where it is to be used and at an unillustrated position where it is to be contained.

Figure 4A:
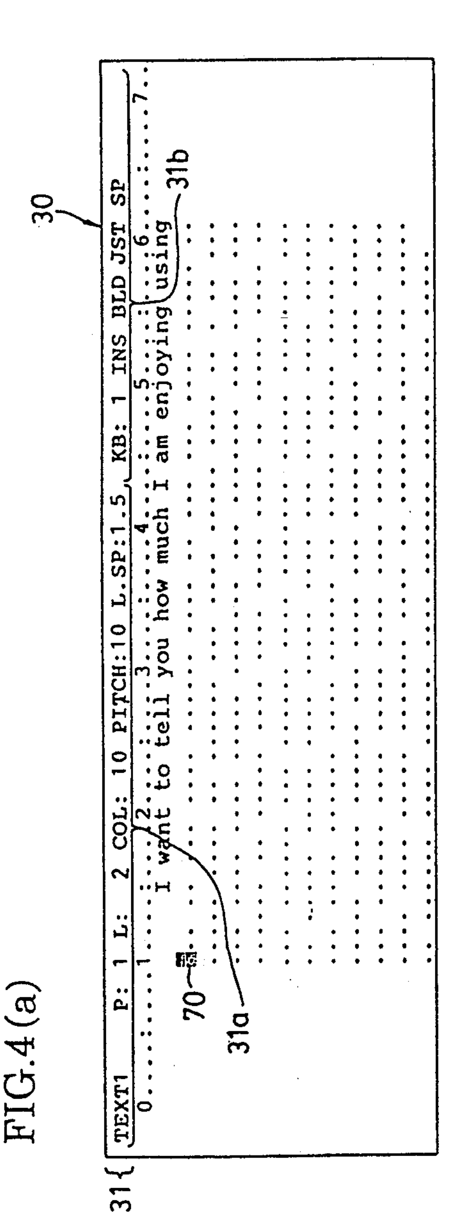
FIGS. 4(*a*) through 4(*c*) are diagrams illustrative of the control in the display of the dual screens, respectively.
Figure 4B:
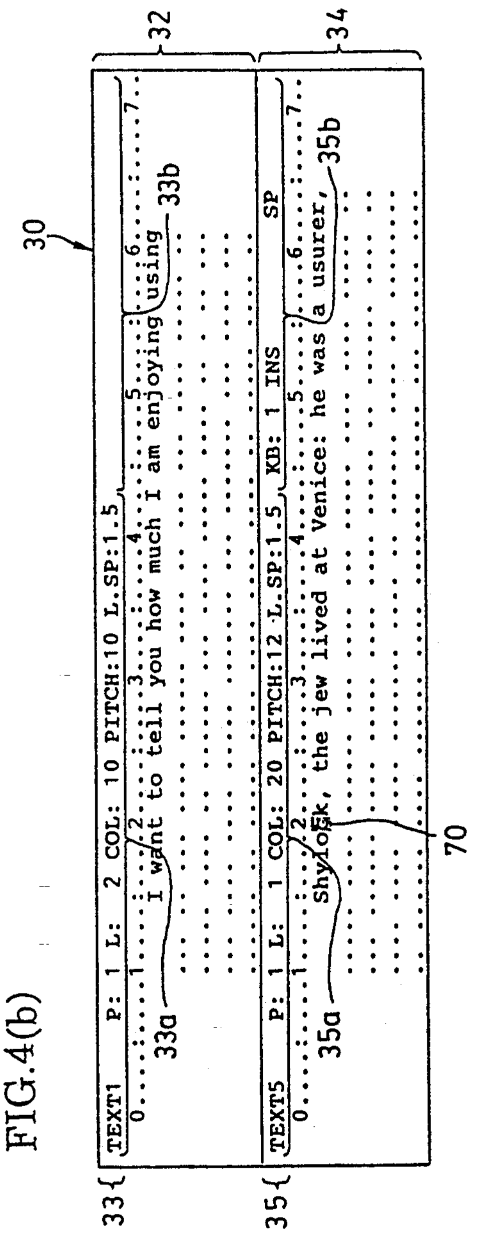
Figure 4:
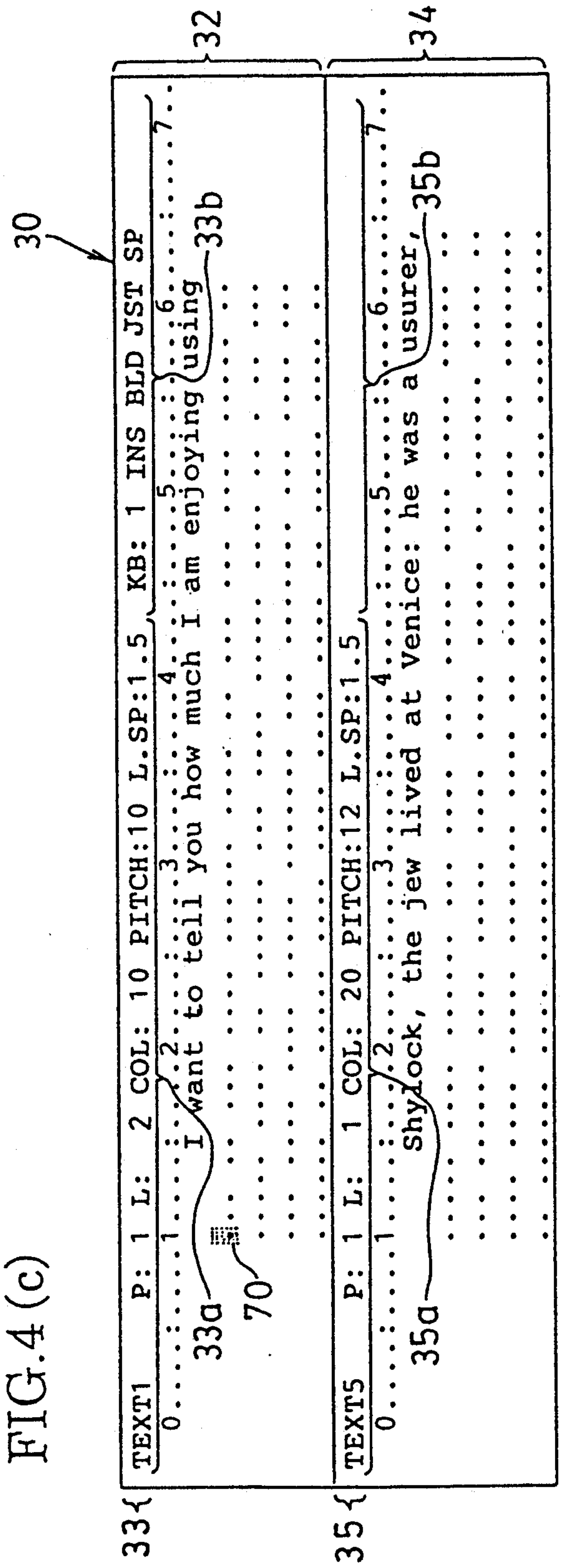

The keyboard 3 is provided with character keys 4 including alphanumeric keys, number keys and symbol keys, a space key 5, a return key 6, cursor movement keys 7 for moving a cursor 70 (shown in FIGS. 4(*a*)–4(*c*)) on the display 30 vertically and horizontally, a menu key 8 for displaying a main menu comprising a plurality of main items, a current-screen changeover key 9 for changing a current screen with the cursor 70 displayed thereon from a first display screen 32 to a second display screen 34 or vice versa in a dual screen display mode, a cancel key 10 for canceling the execution of various functions, a spell check key 11 for setting a spell check mode for checking the spelling of words to be input, an underline key 12 for cyclically setting a word mode for printing the underline on a word alone, a continuous mode for printing the underline on a space, and an off mode for canceling printing of the underline, a bold key 13 for setting a bold mode for applying the boldface to characters, an expansion key 14 for setting an expansion mode for performing printing with expanded characters, a justification key 15 for setting a justification mode for printing respective printing lines in the justified form, an insertion mode key 16 for setting an insertion mode, a print pitch setting key 17 for cyclically setting a print pitch to a pica pitch (10 characters/inch), an elite pitch (12 characters/inch) and a micron pitch (15 characters/inch), a line space setting key 18 for cyclically setting a line space to one time, one and one-half times, twice and three times the original line space, a keyboard selector switch 19 for selecting the keyboard mode, and various function keys.

The printing mechanism PM has a well-known construction. It comprises a platen 20 for feeding a printing sheet, a carriage 21 movable to the left and right directions along the platen 20, a petal-type daisy wheel 22 having a plurality of fonts formed in the distal ends of spokes protruding in the radial direction, a ribbon cassette 23 having a print ribbon contained therein and a hammer solenoid 24 for hitting the fonts.

Figure 2:
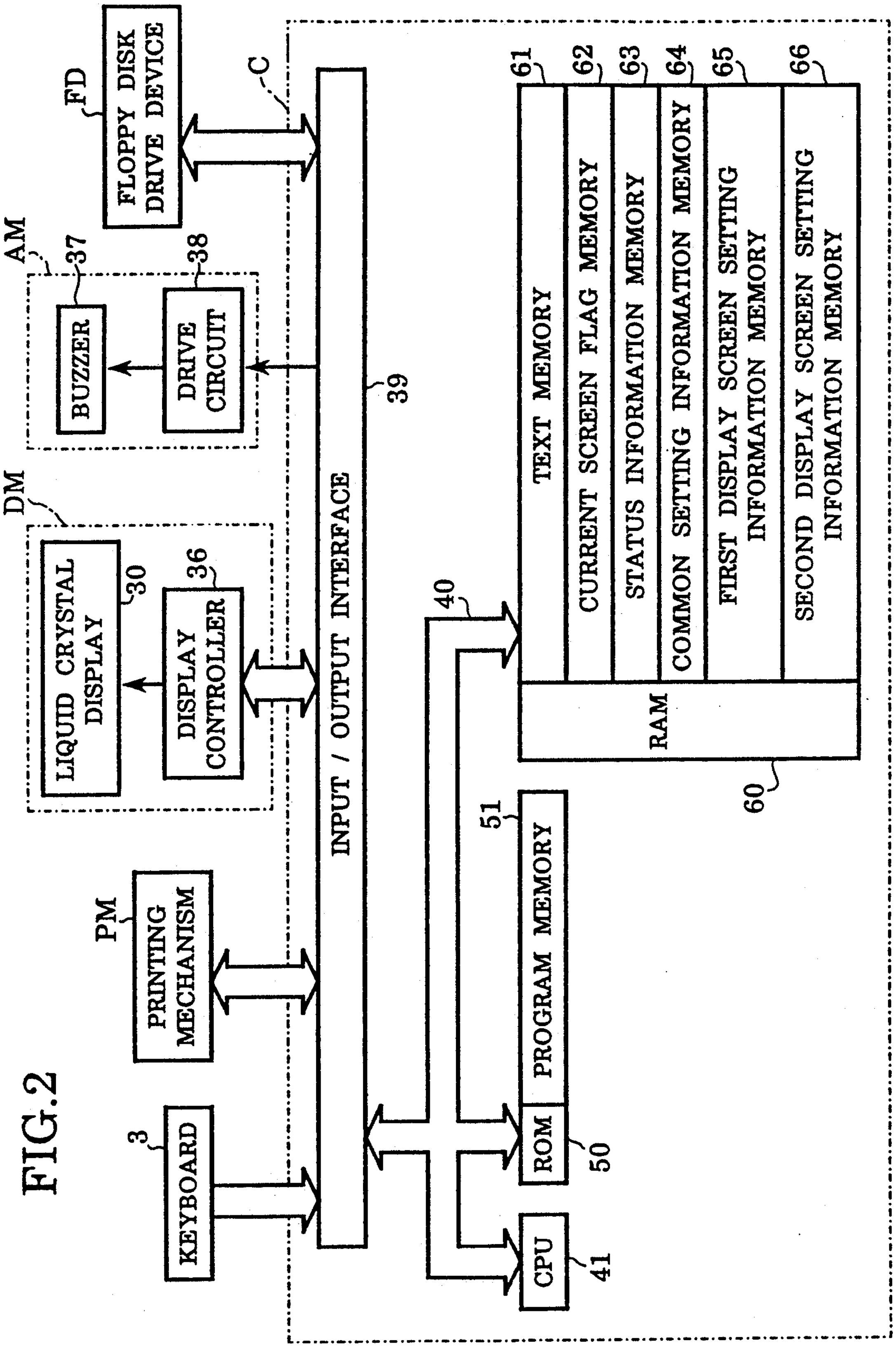
FIG. 2 is a block diagram of a control system of the word processor.

A description will now be made of the overall structure of a control system of the word processor 1 with reference to a block diagram shown in FIG. 2.

The word processor 1 basically comprises the keyboard 3, the printing mechanism PM, a display mechanism DM, an alarm mechanism AM, a floppy disk drive device FD for writing data into a floppy disk and reading the same therefrom, a controller C, etc. The keyboard 3, the printing mechanism PM, the display mechanism DM, the alarm mechanism AM and the floppy disk drive device FD are connected to an input/output interface 39 in the controller C.

The display mechanism DM has a well-known construction. It comprises the liquid crystal display 30, and a display controller 36 including a display RAM for outputting display data to the display 30 and a character generator ROM having a number of dot patterns such as characters and symbols contained therein. However, the screen of the display 30 can be divided into two screens, i.e., a first display screen 32 corresponding to 7 lines displayed on the upper half of the screen, and a second display screen 34 corresponding to 7 lines displayed on the lower half thereof.

The alarm mechanism AM comprises a buzzer 37 and a drive circuit 38 for energizing the buzzer 37 to produce a sound.

The controller C comprises a CPU 41, the input/output interface 39 electrically connected to the CPU 41 via a bus 40 such as a data bus, a ROM 50 and a RAM 60.

A program memory 51 in the ROM 50 stores therein: a control program for controlling the printing mechanism PM; the display mechanism DM and the floppy disk drive device FD in response to code data input from the keyboard 3; a document writing control program for classifying input document data for each document to write the same into a text memory 61; a cursor movement control program for moving the cursor 70 onto the display 30 according to the operation of the cursor movement key 7; a status information writing control program for storing, in a status information memory 63, status information including (1) cursor positional information including values of page numbers, line numbers and column numbers indicative of the positions of the cursor 70 moved based on the cursor movement control program, (2) document names of the documents displayed on the display 30, and (3) values of the print pitch and the line space set in the documents or set by the print pitch setting key 17 or the line space setting key 18; an information display control program for displaying, in a status information display region 31*a* (shown in FIG. 4(*a*)) of an information display line 31 in the display 30, various status information read from the status information memory 63 when a display mode is a normal single-screen display mode other than a dual-screen display mode, the information display control program further displaying currently-set various setting information read from a common setting information memory 64 and a first display-screen setting information memory 65 in a L setting information display region 31*b* (shown in FIG. 4(*a*)) of the information display line 31; and a dual-screen display control program for changing the display 30 to the dual screen to display the document data and various setting information, etc. thereon.

The RAM 60 is provided with the text memory 61 for storing therein document data representative of a plurality of input documents, a current screen flag memory 62 for storing therein a current screen flag F set when a current screen is changed to the second display screen 34 in the dual-screen display mode and reset when the current screen is changed to the first display screen 32 in that mode, the status information memory 63 for storing therein various status information, the common setting information memory 64 for storing therein common setting information selected out of setting information about various control modes such as a keyboard mode, an insertion mode and a spell check mode, the common setting information being displayed on the first display screen 32 and the second display screen 34 commonly. The setting information is selected out of setting information about the various control modes. The first display-screen setting information memory 65 is for storing therein setting information, which is related to the character boldness and the form to be printed (justified or unjustified), other than the common setting information, when the display mode is the single-screen display mode and the first display screen 32 is the current screen. The second display-screen setting information memory 66 is for storing therein setting information other than the common setting information when the second display screen 34 is the current screen. Various memories (not shown) further temporarily store therein the results of computation of the CPU 41.

Figure 3A:
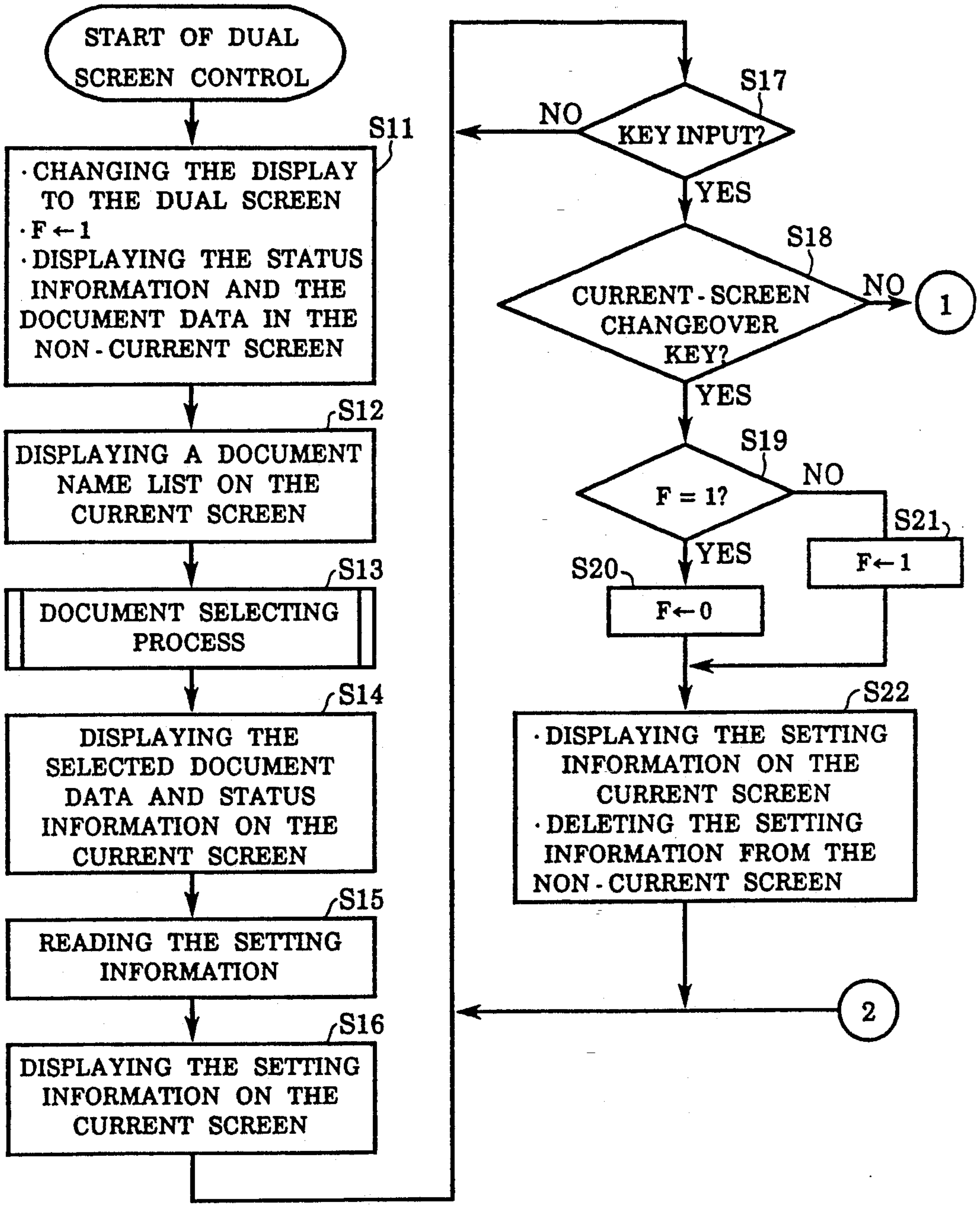
FIGS. 3(*a*) and 3(*b*) are the schematic flow chart of a routine for controlling the display of a dual screen.
Figure 3B:
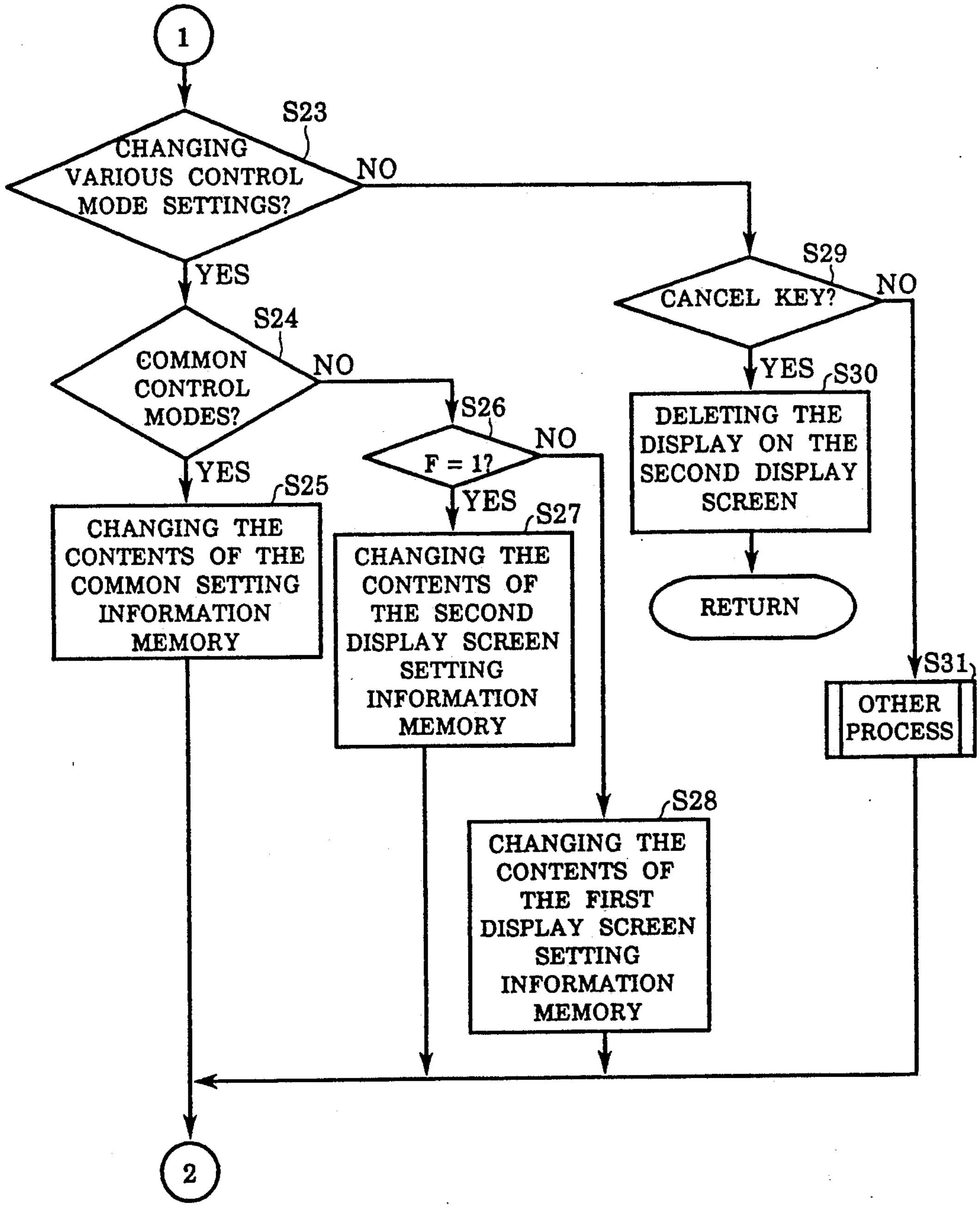

A description will now be made of a routine for controlling the display of the dual screen, which is effected by the controller C in the word processor 1, with reference to a flow chart shown in FIGS. 3(*a*) and 3(*b*), in which the reference character Si (i=1, 2, 3, . . . ) represents each of a plurality of steps. In a stage prior to a start in the control for the display of the dual screen, document data being input is displayed on lines subsequent to the third display line in the display 30, as shown in FIG. 4(*a*) by way of example. At this time, respective item names of status information comprising a page number "P: ", a line number "L: ", a column number "COL: ", a printing pitch "PITCH: " and a line space "L.SP: " related to positions for displaying the cursor 70 in addition to a document name "TEXT 1" are displayed in the status information display region 31*a* of the information display line 31 (top or head line) in accordance with the information display control program. Data corresponding to the above respective item names is read from the status information memory 63 and then displayed within the respective items. Also displayed in the setting information display region 31*b* are the keyboard mode "KB:1", the insertion mode "INS", and the spell check mode "SP" which have been set based on data from the common setting information memory 64 and the bold mode "BLD" and the justification mode "JST" which have been set based on data from the first display-screen setting information memory 65.

The menu key 8 is then operated to display a main menu on the display 30. When a main item "FORM" (not shown) is selected from the displayed main menu and a sub item "dual screen" (not shown) is chosen from a sub menu belonging to the main item "FORM", the dual-screen display mode is set and the control shown in FIGS. 3(*a*) and 3(*b*) is initiated. Then, the display 30 is changed to the dual screen comprising the first display screen 32 and the second display screen 34 and the current screen flag F is set. The second display screen 34 on the lower half of the display 30 is initially set as the current screen, and the same status information as that in the single-screen display mode is read from the status information memory 63 and then displayed in a status information display region 33*a* of an information display line 33 in a non-current screen (the first display screen at this point). In addition, upper-half five lines of the document data in the single-screen display mode are displayed continuously (in S11). However, no setting information is displayed in a setting information display region 33*b* of the noncurrent screen.

Then, a document name list for documents which have been stored in a floppy disk is read from the floppy disk drive device FD to be displayed on the current screen (the second display screen 34) (in S12). The cursor movement key 7 is operated to move the cursor 70, thereby selecting a desired document (in S13). As a consequence, document data of the selected document is displayed on the current screen. Document names, and item names of the status information are displayed in a status information display region 35*a* (shown in FIGS. 4(*b*) or 4(*c*)) of an information display line 35 in the current screen, and the positional information of the cursor 70, print pitch data and line space data included in the document data are visually represented within respective items (in S14). The name of the mode (setting information) which has been set at present is then read from the common setting information memory 64 (in S15). The read mode name is displayed in a setting information display region 35*b* (shown in FIGS. 4(*b*) and 4(*c*)) of the information display line 35 (in S16). When the dual-screen display mode is established while the document data shown in FIG. 4(*a*) is being displayed in the single-screen display mode, for example, the display 30 is changed to the dual screen comprising the first display screen 32 and the second display screen 34, as shown in FIG. 4(*b*). Then, the same document data and the same status information as those shown in FIG. 4(*a*) are continuously displayed on the non-current screen (the first display screen 32) and in the status information display region 33*a*, respectively. The document data of the selected document is displayed on the current screen (the second display screen 34). In addition, a document name "TEXT 5" and the item names of the status information similar to that displayed in the status information display region 33*a* are displayed in the status information display region 35*a* of the information display line 35. The positional information of the cursor 70, the print pitch data and the line space data included in the document data of the document "TEXT 5" are also visually represented in the respective items. Furthermore, the names of modes, i.e., "KB:1", "INS" and "SP", which are set in common with respect to both display screens 32 and 34, are displayed in the setting information display region 35*b* of the information display line 35.

Then, it is determined if a key is input (S17). In addition, it is also determined whether or not the current-screen changeover key 9 is operated (S18). When the current screen changeover key 9 is operated (Yes in S17 and S18) and when the current screen flag F has been set (Yes in S19), the current screen flag F is reset and the current screen is changed to the first display screen 32 (in S20). On the other hand, when the current screen flag F has been reset (No in S19), the current screen flag F is set and the current screen is changed to the second display screen 34 (in S21). Then, the common setting information is displayed in the setting information display region 33*b* or 35*b* of the current screen based on the setting information stored in the common setting information memory 64. Thus, in this example, the common setting information "KB:1", "INS" and "SP" is displayed in the setting information display region 33*b* or 35*b* of the current screen based on setting information stored in the common setting information memory 64. The remaining setting information stored in the first display-screen setting information memory 65 or the second display-screen setting information memory 66 is displayed. Thus, in this example, the setting information "BLD" and "JST" stored in the first or second display-screen setting information memory 65 or 66, respectively, is displayed depending on which screen is the current screen. In addition, the setting information is deleted from the setting information display region 33*b* or 35*b* of the non-current screen (in S22). The routine procedure is thereafter returned to S17. However, the cursor 70 is always controlled so as to be displayed on the current screen. As shown in FIG. 4(*b*), by way of example, when the second display screen 34 is the current screen, the current screen is changed to the first display screen 32 as shown in FIG. 4(*c*) when the current screen changeover key 9 is operated. As a consequence, the setting information stored in the common setting information memory 64 and the setting information stored in the first display-screen setting information memory 65 are displayed only in the setting information display region 33*b* thereof. As depicted in FIG. 4(*c*), when the first display screen 32 is of the current screen, the current screen is changed to the second display screen 34 when the current screen changeover key 9 is operated, as depicted in FIG. 4(*b*), so that the setting information stored in the common setting information memory 64 and the setting information stored in the second display-screen setting information memory 66 are displayed only in the setting information display region 35*b* thereof. When the underline key 12 is operated to establish the continuous mode, "CNT" is displayed in a predetermined portion, e.g., next to "SP", of the setting information display region 33*b* or 35*b* of the current screen. When the expansion key 14 is operated to set the expansion mode, "EXP" is displayed in a predetermined portion, e.g., next to "CNT", of the setting information display region 33*b* or 35*b* thereof.

The keys 11 through 16 and the keyboard selector switch 19 are then operated to change various control mode settings whose modes are related to the character decoration or enhancement and the printing form (Yes in S23). At this time, where such control modes are common control modes such as the insertion mode, the spell check mode, etc. (Yes in S24), the control mode settings are changed in the common setting information memory 64, and the setting information subsequent to the change in the mode settings is displayed (in S25). On the other hand, when the control modes to be changed are not common control modes and the current screen is of the second display screen 34 (No in S24 and Yes in S26), the control mode settings are changed in the second display-screen setting information memory 66 and the setting information subsequent to the change in the mode settings is displayed (in S27). When the control modes to be changed are not common modes and the current screen is of the first display screen 32 (No in S24 and S26), the control mode settings are changed in the first display-screen setting information memory 65, and the setting information subsequent to the change in the mode settings is displayed (in S28).

When the process "save" for writing edited document data into a floppy disk or the process "delete" for removing the edited document data therefrom is executed after a designation of a main item "file" (not shown), the current screen is deleted.

When keys other than the current screen changeover key 9, the cancel key 10 and the keys 11 through 16, for example, the cursor movement key 7, the character keys 4 and the function keys are operated (Yes in S17 and No in S29), the process corresponding to the operated keys is executed (in S31). When the cancel key 10 is operated (Yes in S17 and S29), the normal single-screen display mode is set and the document data and various information on the second display screen 34 are deleted (in S30). The control for the display of the dual screen is thereafter completed, and the procedure is returned to the main routine.

Even when the current screen is fixed to the first display screen 32 or the second display screen 34 in the case of the dual screen display, the setting information can also be displayed only on the current screen.

As has been described above, since the setting information about the various control modes is displayed only in the setting information display region 33*b* or 35*b* of the current screen in the dual screen display mode, the current screen can easily and clearly be determined by identifying the screen having the setting information displayed thereon, even when the location of the cursor 70 is not clear.

The present invention can be applied to various word processors capable of displaying the dual screens, such as an English language word processor and a Japanese language word processor of the type wherein the floppy disk drive devices are provided and the document data is stored in the floppy disks.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A dual screen control apparatus for a word processor, comprising:

display means comprising a display screen having a single display screen mode wherein said display screen comprises a single display screen, and a dual screen display mode wherein said single display screen is divided into two separate screens to display a dual screen, said dual screen comprising a first display screen in a first area of said dual screen and a second display screen in a second area of said dual screen, each of said first and second display screens having a setting information display area, only one of said first and second display screens displaying a cursor, wherein the one of said first and second display screens displaying the cursor is a current screen and the other of said first and second display screens is a non-current screen;

means for storing setting information representative of various control modes for each of said first and second display screens; and means for displaying the setting information stored in the setting information storing means in said setting information display area of only the current screen while displaying a blank screen in said setting information display area of said non-current screen.

2. The dual screen control apparatus as claimed in claim 1, wherein said various control modes control character decoration.

3. The dual screen control apparatus as claimed in claim 2, wherein said various control modes include one of a bold mode for applying a boldface to characters, an underline control mode for controlling supply of an underline and a character expansion mode for performing printing with expanded characters.

4. The dual screen control apparatus as claimed in claim 3, wherein said various control modes include a justification mode for printing respective printing lines in a justified form.

5. The dual screen control apparatus as claimed in claim 4, wherein said various control modes include on of a keyboard mode, a spell check mode and an insertion mode.

6. The dual screen control apparatus as claimed in claim 1, said apparatus further comprising display changing means for changing said display means from a single-screen display mode to a dual-screen display mode and from the dual-screen display mode to the single-screen display mode.

7. The dual screen control apparatus as claimed in claim 6, wherein said first display screen is located on an upper region of the display means and said second display screen is located on a lower region of display means, and wherein said second display screen is set as the current screen when a mode is initially changed from the single-screen display mode to the dual-screen display mode by the display changing means.

8. The dual screen control apparatus as claimed in claim 1, wherein each of the first display screen and the second display screen includes an information display line comprising said setting information display area for displaying setting information and a status information display area for displaying status information.

9. The dual screen control apparatus as claimed in claim 1, further comprising current screen changing means for changing a current screen from one of said first and second display screens to the other of said first and second display screens;

wherein said means for displaying the setting information displays the setting information selectively in only the one of the first and second display screens that is the current screen and said means for displaying setting information automatically displays the setting information in response to said current screen changing means changing the current screen.

10. A dual screen control apparatus for a word processor, comprising:

means for inputting document data and various command signals;

means for storing the input document data;

display means comprising a display screen having a single display screen mode wherein said display screen comprises a single display screen, and a dual screen display mode wherein said single display screen is divided into two separate screens to display a dual screen, said dual screen comprising a first display screen in a first area of said dual screen and a second display screen in a second area of said dual screen, each of said first and second display screens having a setting information display area;

display control means for displaying document data representative of two documents, said display control means displaying document data representative of a first of said two documents read from the document data storing means on the first display screen and displaying document data representative of a second of said two documents on the second display screen, wherein only one of said first and second display screens displays a cursor, the one of said first and second display screens displaying the cursor is a current screen and the other of said first and second display screens is a non-current screen;

means for storing therein setting information representative of various control modes for each display screen, the modes being set via the inputting means; and means for displaying the setting information stored in the setting information storing means in said setting information display area of only the current screen while displaying a blank screen in said setting information display area of said non-current screen.

11. The dual screen control apparatus as claimed in claim 10, wherein said various control modes control character decoration.

12. The dual screen control apparatus as claimed in claim 11, wherein said various control modes include one of a bold mode for applying a boldface to characters, an underline control mode for controlling supply of an underline and a character expansion mode for performing printing with expanded characters.

13. The dual screen control apparatus as claimed in claim 10, said apparatus further comprising display changing means for changing said display means from a single-screen display mode to a dual-screen display mode and from the dual-screen display mode to the single-screen display mode.

14. The dual screen control apparatus as claimed in claim 13, wherein said first display screen is located on an upper region of the display means and said second display screen is located on a lower region of the display means, and wherein said second display screen is set as the current screen when a mode is initially changed from the single-current display mode to the dual-screen display mode by the display changing means.

15. The dual screen control apparatus as claimed in claim 10, wherein each of the first display screen and the second display screen includes an information display line comprising said setting information display area for displaying setting information and a status information display area for displaying status information.

16. The dual screen control apparatus as claimed in claim 10, wherein said various control modes include a justification mode for printing respective printing lines in a justified form.

17. The dual screen control apparatus as claimed in claim 10, wherein said various control modes include one of a keyboard mode, an insertion mode and a spell check mode.

18. A dual screen control apparatus for a word processor, comprising:

display means comprising display screen having a single display screen mode wherein said display screen comprises a single display screen, and a dual screen display mode wherein said single display screen is divided into two separate screens to display a dual screen, said dual screen comprising a first display screen in a first area of said dual screen and a second display screen in a second area of said dual screen, each display screen displaying different data thereon, only one of said first and second display screens displaying a cursor, wherein the one of said first and second display screens displaying the cursor is a current screen;

means for storing setting information representative of various control modes for each of said first and second display screens;

means for displaying the setting information stored in the setting information storing means in a predetermined position of only the current screen when said display means displays a dual screen; and current screen changing means for changing a current screen from one of said first and second display screens to the other of said first and second display screens;

wherein said means for displaying the setting information displays the setting information selectively in only the one of the first and second display screens that is the current screen, and said means for displaying setting information automatically displays the setting information in response to said current screen changing means changing the current screen.

19. The dual screen control apparatus as claimed in claim 18, wherein each of the first display screen and the second display screen includes an information display line comprising a setting information display area for displaying setting information and a status information display area for displaying status information.

20. The dual screen control apparatus as claimed in claim 18, said apparatus further comprising display changing means for changing said display means from a single-screen display mode to a dual-screen display mode and from the dual-screen display mode to the single-screen display mode.

* * * * *